US010411504B2

(12) United States Patent
Picard et al.

(10) Patent No.: US 10,411,504 B2
(45) Date of Patent: Sep. 10, 2019

(54) SYSTEM AND METHOD FOR CONTROLLING POWER DELIVERED TO A POWERED DEVICE THROUGH A COMMUNICATION CABLE

(71) Applicant: Texas Instruments Incorporated, Dallas, TX (US)

(72) Inventors: Jean Picard, Hooksett, NH (US); William Taylor, Hollis, NH (US)

(73) Assignee: Texas Instruments Incorporated, Dallas, TX (US)

( * ) Notice: Subject to any disclaimer, the term of this patent is extended or adjusted under 35 U.S.C. 154(b) by 1314 days.

(21) Appl. No.: 14/312,958

(22) Filed: Jun. 24, 2014

(65) Prior Publication Data

US 2015/0035365 A1    Feb. 5, 2015

Related U.S. Application Data (60) Provisional application No. 61/860,471, filed on Jul. 31, 2013.

(51) Int. Cl.
*H04L 12/10* (2006.01)
*H02J 13/00* (2006.01)
*H02J 7/00* (2006.01)

(52) U.S. Cl.
CPC ........ *H02J 13/0003* (2013.01); *H02J 7/0052* (2013.01); *H04L 12/10* (2013.01); *H02J 2007/006* (2013.01); *Y10T 307/469* (2015.04)

(58) Field of Classification Search
CPC ........ H02J 13/003; H02J 7/0052; H02J 12/10; H02J 2007/006; Y10T 307/468
USPC .......................................................... 307/39
See application file for complete search history.

(56) References Cited

U.S. PATENT DOCUMENTS

| 7,550,980 B2 | 6/2009 | Picard et al. |
| 7,705,741 B2 | 4/2010 | Picard |
| 2003/0107269 A1 | 6/2003 | Jetzt |
| 2005/0078700 A1 | 4/2005 | Thompson et al. |
| 2006/0019629 A1 | 1/2006 | Berson et al. |

(Continued)

FOREIGN PATENT DOCUMENTS

| CN | 101147355 A | 3/2008 |
| CN | 101223486 A | 7/2008 |

(Continued)

OTHER PUBLICATIONS

Office Action from Japanese Patent Application No. 2016-531911, dated Jul. 23, 2018 (pp. 1-3).
Herbold, et al., "Power Over Internet (PoE)," IEEE 802.3af, Nikkei Electronics, Nov. 24, 2003 (pp. 1-8).
Darshan, et al., "Analysis of Usable PD Input Power in 4P System," IEEE802.3 4P Study Group, Rev. 003A, Microsemi, Geneva Switzerland, Jul. 2013 (pp. 1-28).

(Continued)

*Primary Examiner* — Daniel Kessie
*Assistant Examiner* — Swarna N Chowdhuri
(74) *Attorney, Agent, or Firm* — Tuenlap Chan; Charles A. Brill; Frank D. Cimino (57) ABSTRACT

Power over Ethernet (PoE) communication systems, control circuits and methods are presented for controlling power delivered to a powered device through a communication cable, in which a power sourcing equipment measures a supply voltage and selectively discontinues provision of power from a power source in response to a measured supply current exceeding an adaptive limit signal representing a supply current level corresponding to a predetermined safe operating power level at the measured supply voltage.

14 Claims, 4 Drawing Sheets

(56) References Cited

U.S. PATENT DOCUMENTS

| | | |
|---|---|---|
| 2006/0082220 A1 | 4/2006 | Karam et al. |
| 2006/0164769 A1* | 7/2006 | Stanford ............... H04L 49/351 |
| | | 361/87 |
| 2006/0215680 A1 | 9/2006 | Camagna |
| 2006/0218418 A1 | 9/2006 | Camagna et al. |
| 2006/0218421 A1 | 9/2006 | Camagna et al. |
| 2006/0238250 A1 | 10/2006 | Camagna et al. |
| 2006/0273661 A1 | 12/2006 | Toebes et al. |
| 2007/0177411 A1 | 8/2007 | Picard |
| 2008/0175260 A1* | 7/2008 | Hussain ................. H04L 12/66 |
| | | 370/419 |
| 2008/0238656 A1* | 10/2008 | de la Torre Vega .... H04L 12/10 |
| | | 340/538.16 |
| 2012/0317426 A1* | 12/2012 | Hunter, Jr. ............. H04L 12/10 |
| | | 713/300 |
| 2013/0166236 A1* | 6/2013 | Vladan ................... G06F 1/266 |
| | | 702/64 |
| 2013/0219195 A1 | 8/2013 | Picard |

FOREIGN PATENT DOCUMENTS

| | | |
|---|---|---|
| JP | 2008529459 A | 7/2008 |
| RU | 2427019 | 8/2011 |
| WO | WO2006081078 A2 | 8/2006 |
| WO | WO2007012074 | 1/2007 |

OTHER PUBLICATIONS

State Intellectual Property Office of PRC, Notification of First Office Action, Search Report, dated Nov. 17, 2017, 4 pages.
PCT/US14/049249 Search Report dated Dec. 11, 2014.
RU2427019 English Machine Translation, pp. 1-8.
Rogachev et al., Texas Instruments, "Implementing a 60-W, End-to-End PoE System", Application Report, SLVA298, Feb. 2012.
Texas Instruments, "Quad IEEE 802.3at Power-Over Ethernet PSE Controller", TPS23851, SLUSAB3B, Sep. 2010, Revised Jun. 2013.

* cited by examiner

SYSTEM AND METHOD FOR CONTROLLING POWER DELIVERED TO A POWERED DEVICE THROUGH A COMMUNICATION CABLE

This application claims priority to and the benefit of U.S. Provisional Patent Application Ser. No. 61/860,471 that was filed on Jul. 31, 2013 and is entitled PoE SAFETY POWER LIMITER, the entirety of which is incorporated by reference herein.

FIELD OF THE INVENTION

The present disclosure relates to networking technology and more particularly to providing power through data cabling to provide power to a powered device (PD) within specified limits.

BACKGROUND

Power over Ethernet (PoE) technology facilitates provision of electrical power to one or more devices connected to a network, such as cameras and other audiovisual equipment, wireless access points, etc. The power sourcing equipment (PSE) provides power supply connection to one end of an Ethernet communication cable and the power consuming device (PD) is connected to the second end. In some high power PoE applications it is desirable to provide a maximum amount of power to one or more powered devices while meeting safety specifications and guidelines set by safety agencies. The supply and control of applied power in PoE systems is provided at the source end, commonly in an endspan Ethernet switch or an intervening (midspan) device, where the power sourcing equipment queries the powered device or devices and ensures that the load does not draw more power than is allowed. Typical PoE power sourcing equipment is only able to detect an overcurrent condition as defined by the IEEE 802.3 standard, but variance in supply voltage can lead to situations in which a detected current does not accurately reflect the amount of delivered power, and a system may not deliver the maximum safe amount of power to the powered device(s). Accordingly, a need exists for improved apparatus and techniques for providing power though a communication cable within specified power limits while delivering the true maximum safe amount of power.

SUMMARY

Apparatus and methods are disclosed for operating power sourcing equipment in PoE and other systems, in which adaptive current limiting techniques are implemented in a controller IC or other circuitry by which sensed or measured current can be compared with an adaptive current reference generated at least partially according to the measured supply voltage to safely supply the maximum approved amount of power through a data cable even with a large variability in supply voltage. The techniques and apparatus of the present disclosure may be applied to provide a low cost solution to power a constant power load which requires a power draw close to maximum safe levels, allowing a given system to be designed for significantly higher power applications, while meeting safety agency requirements.

A communication system is provided, including a communication cable with first and second wire pairs, and a power source operative to provide a supply voltage and to supply current to the first wire pair. The system also comprises a switching device including a first switch terminal coupled with the second wire pair, a second switch terminal coupled with a second power source terminal, and a control terminal. The switching device is operative in a first mode when the control terminal is in a first voltage range to allow supply current to flow from the second wire pair to the second power source terminal and in a second mode when the control terminal is in a second voltage range to inhibit current flow from the second wire pair to the second power source terminal. A switch control circuit and a limit circuit are provided, with the switch control circuit receiving a first sense signal at least partially representing the supply current flowing from the second wire pair to the second power source terminal, and a limit signal. An output of the switch control circuit selectively controls the voltage at the switching device control terminal to be in the second voltage range responsive to the first sense signal exceeding the limit signal. The limit circuit comprises an input receiving a second sense signal representing the supply voltage, and an output coupled to provide the limit signal to the second input of the switch control circuit based at least partially on the second sense signal. Various switch control circuit embodiments thus advantageously turn off the switching device, thereby discontinuing supply of power to the communication cable in response to the sensed current exceeding an adaptive current limit signal generated at least partially according to the measured supply voltage, thereby achieving "adaptive" current limit, or "adaptive fuse" performance.

In certain embodiments, the limit signal is at least partially inversely related to the second sense signal, and the limit circuit may provide the limit signal corresponding to a constant power output of the power source in certain embodiments. The limit circuit in certain embodiments includes an amplifier circuit with a first input receiving the second sense signal and a second input coupled with an offset signal, as well as an amplifier output providing the limit signal. The supply turn off operation may be delayed to mitigate unnecessary tripping for transient conditions, with certain system embodiments including a delay circuit coupled with the output from the switch control circuit to selectively control the switch control terminal voltage to be in the second voltage range if the first sense signal exceeds the limit signal for a predetermined time.

Multi-port embodiments are possible for cables having third and fourth wire pairs, where the first power source terminal is coupled to provide a second supply current to the third wire pair, with a second switching device coupled between the fourth wire pair and the second power source terminal. A summing circuit receives first and second current sense signals respectively representing the supply current flowing from the second and fourth wire pairs to the second power source terminal, and a summing circuit output provides the first sense signal to the first input of the switch control circuit representing the sum of the supply currents flowing to the second power source terminal. The switch control circuit output selectively controls the voltages at the switching device control terminals to be in the second voltage range responsive to the first sense signal exceeding the limit signal.

An integrated circuit (IC) is provided according to further disclosed aspects for controlling power provided from a power source to a powered device through an Ethernet or other communication cable. The IC includes a first input terminal receiving a first sense signal representing a supply current flowing through the cable, as well as a second input terminal receiving a second sense signal representing a supply voltage, and an output providing a limit signal corresponding to a constant power output of the power source based at least partially on the second sense signal. The IC includes a comparator circuit with a first input coupled with the first input terminal, and a second input coupled with the limit circuit output. The comparator circuit provides an output signal in a first state when the first comparator input voltage is greater than the second comparator input voltage, and in a second state when the first comparator input voltage is less than the second comparator input voltage. The IC further includes an output terminal coupled with the comparator output and operative to provide a switch control output signal in a first state to turn off a switching device connected between the power source and the Ethernet cable responsive to the comparator output providing the comparator output signal in the first state.

Embodiments of the IC may include a delay circuit to turn off the switching device if the comparator output signal transitioning to the first state and remains in that state for a non-zero predetermined time. In certain embodiments, the limit circuit includes a differential amplifier circuit with a first input coupled to receive the second sense signal, a second input coupled to receive an offset voltage signal, and a differential amplifier output coupled to provide the limit signal to the second comparator input.

Multi-port control is provided in certain IC embodiments, where a third input terminal receives a third sense signal representing a second supply current flowing through the cable, a second output terminal is coupled with the comparator output to control a second switching device connected between the power source and the cable, and the IC includes a summing circuit providing an output to the first comparator input as a voltage signal representing the sum of the supply currents flowing through the cable.

Further aspects of the disclosure provide a method for powering a device through a communication cable in a power over Ethernet system. The method includes measuring a supply voltage, generating a limit signal corresponding to a predetermined safe operating power output level of the power source based at least partially on the measured supply voltage, measuring a supply current flowing through the communication cable, comparing the measured supply current with the limit signal, and selectively discontinuing provision of power from the power source to the communication cable if the measured supply current exceeds the limit signal. In certain embodiments, a second supply current is measured, the measured supply currents are summed and the total supply current is compared with the limit signal. The limit signal in certain embodiments is generated to represent a supply current level corresponding to the predetermined safe operating power output level of the power source at the measured supply voltage. Embodiments of the method may involve discontinuing provision of power from the power source to the communication cable if the measured supply current exceeds the limit signal for a predetermined non-zero time.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

One or more embodiments or implementations are hereinafter described in conjunction with the drawings, wherein like reference numerals are used for reference to like elements throughout, and wherein the various features are not necessarily drawn to scale.

Figure 1:
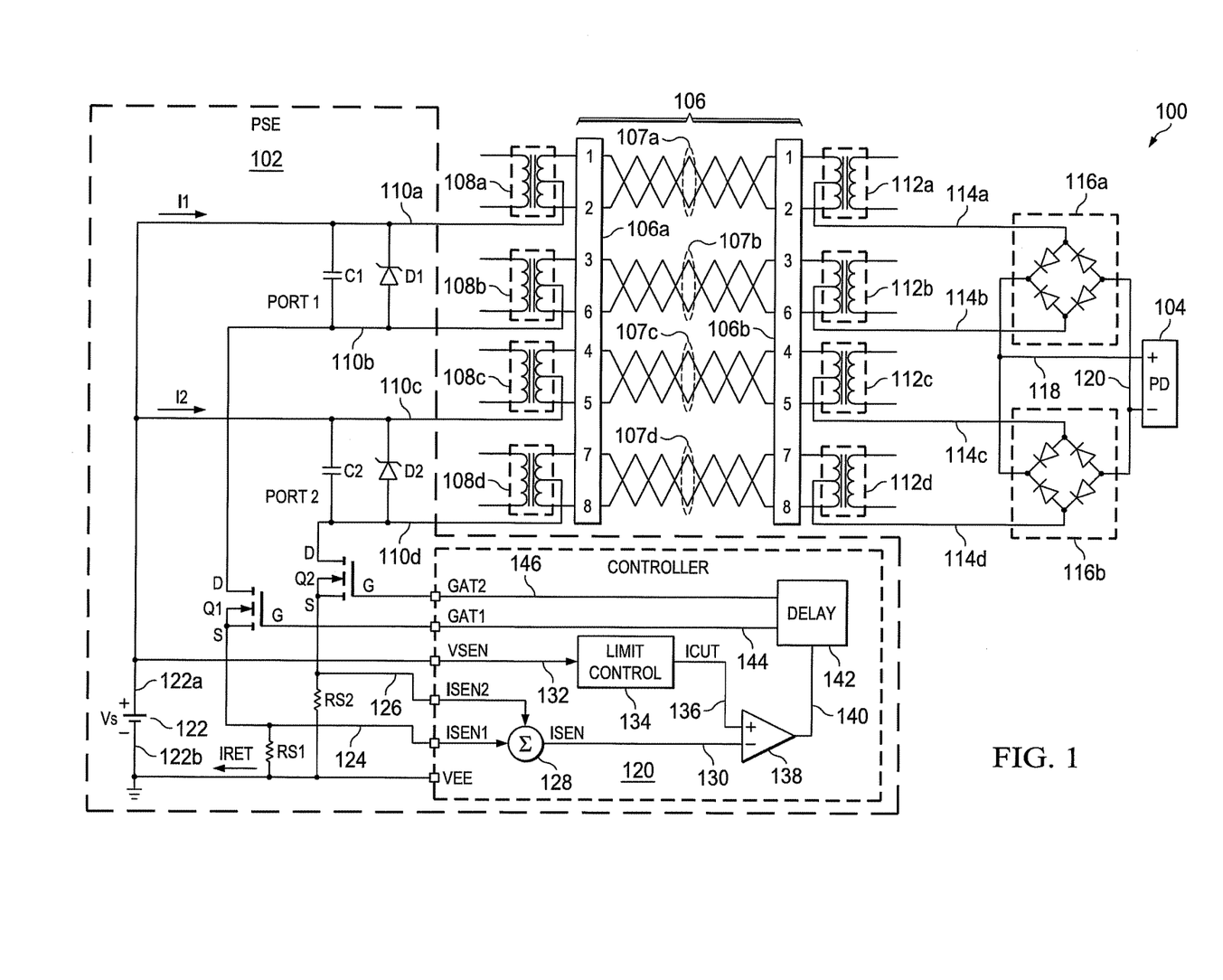
FIG. 1 is a schematic diagram illustrating a communication system including a Power over Ethernet power sourcing equipment controller integrated circuit with an adaptive current limiting circuit controlling provision of power to a powered device through two ports of an Ethernet cable.

FIG. 1 shows an Ethernet communication system 100 with Power over Ethernet power sourcing equipment 102 operated by a PSE controller IC 120 with an adaptive current limiting circuit 134 controlling provision of power to a powered device 104 through two ports (PORT 1 and PORT 2) of an Ethernet cable 106. Various aspects of the present disclosure can be implemented in other forms or types of systems in which power is provided through a data cable, wherein the illustrated Ethernet example includes first and second ends 106a and 106b having RJ-45 connectors, along with four wire pairs 107a, 107b, 107c and 107d individually extending between the cable ends 106a and 106b. In this example, moreover, two communication ports are provided, for example, providing a transmit (TX) and receive (RX) communications via a corresponding set of two wire pairs 107, with PORT 1 using the first and second wire pairs 107a and 107b, and the second port PORT 2 using the third and fourth wire pairs 107c and 107d. Other embodiments may employ a single port or any suitable number of ports. The power sourcing equipment 102 is electrically connected to the wire pairs 107a, 107b, 107c and 107d at the first end 106a of the connector 106 via center taps of corresponding data transformers 108a, 108b, 108c and 108d. The individual transformers 108 have primary windings for connection to a communication interface (not shown) as well as center-tapped secondary windings connected to the corresponding wire pair 107 of the cable 106.

As seen in FIG. 1, moreover, the power sourcing equipment 102 includes a power source 122 operatively coupled with the wire pairs 107 via connections 110a, 110b, 110c and 110d individually connected to the corresponding center taps of the data transformers 108a, 108b, 108c and 108d. The power source 122 in this example is a DC source with a first (e.g., positive) terminal 122a connected via connections 110a and 110c to the center taps of the first and third wire pairs 107a and 107c at the first end 106a to provide supply currents I1 and I2 to the first and second ports, respectively. As further seen in FIG. 1, a Zener diode D1 may optionally be provided between the connections 100a and 100b along with a parallel capacitor C1. Similarly, a Zener diode D2 and a capacitor C2 may be connected between the connections 100c and 100d as shown.

On the powered device end 106b of the communication cable 106, transformers 112a, 112b, 112c and 112d are provided, having center-tapped secondary windings connected to the corresponding wire pairs 107a, 107b, 107c and 107d, where the center taps of the transformers 112a and 112b are connected via connections 114a and 114b, respectively, as inputs to a diode bridge rectifier circuit 116a whose output terminals are connected via connections 118 and 120 to positive and negative input terminals of the powered device 104. Similarly, power supplied to the second port of the cable 106 is brought from the center tap of the transformer 112c through connection 114c to an input terminal of a second diode bridge rectifier circuit 160b, and return current flows from the second input terminal of the rectifier circuit 116b through a connection 114d to the center tap of the transformer 112d as shown. In this non-limiting configuration, the output of the second rectifier circuit 116b is also connected via connections 118 and 120 to the input of the powered device 104, thereby connecting the outputs of the rectifier circuits 116a and 160b in parallel to power the powered device 104. Other configurations of one or more rectifier circuits 116 may be implemented on the second end of the communication cable 106 in various implementations.

In the power sourcing equipment 102, a first switching device Q1 is connected in series with a first sense resistor RS1 between the return connection 110b and a second (negative) power source terminal 122b, and a second switching devices Q2 is connected with a second sense resistor RS2 between the return connection 110d and the negative power source terminal 122b. The switching devices Q1 and Q2 are NMOS transistors having drain terminals D connected to the respective connections 110b and 110d and source terminals S connected to the corresponding sense resistors RS1 and RS2, although other switching devices may be used, including without limitation MOS transistors, bipolar transistors, etc. The resistors RS1 and RS2 can be any suitable type, preferably of low impedance and high wattage rating (e.g., 0.5 Ω, 1.0 W). The switching devices Q1 and Q2 each include a gate control terminal G, to operate the corresponding switch in a first mode (ON or conductive) when the gate is in a first voltage range (e.g., HI) to allow the corresponding supply current I1, I2 to flow from the second, fourth wire pair 107b, 107d to the negative power source terminal 122b. The switches Q1 and Q2 are turned off (non-conductive) in a second mode when the corresponding gate terminal G is in a second voltage range (e.g., LOW) to discontinue current flow from the cable 106 to the power source terminal 122b. When either or both port power circuits are operating (Q1 and/or Q2 ON), return current IRET flows into the second terminal 122b of the power source 122 as shown in FIG. 1.

The power source 122 provides a supply voltage Vs between the terminals 122a and 122b and selectively provides a supply current I1 from the first terminal 122a to the first wire pair 107a when Q1 is ON, and provides supply current I2 to the third wire pair 107c when Q2 is ON. In certain implementations, multiple power sources can be provided in the power sourcing equipment 102, connected in parallel and/or in series with one another. As previously noted, PoE and other powered data cable systems may be rated for maximum power transfer between the power sourcing equipment 102 and the powered device 104. As shown in FIG. 1, the power supplied via the power source 122 to one or both of the ports can be inhibited or fully discontinued by turning off the corresponding switch Q1, Q2. The power sourcing equipment 102 in this case includes a PSE control circuit, implemented in some embodiments as a controller IC 120 with switch control circuitry 138 and 142 coupled with switch control output terminals 144 and 146 to provide a pair of switch control output signal GAT1 and GAT2 for selective operation of the switching devices Q1 and Q2, respectively. The switching control signals are provided by the controller 120 in either a first state (e.g., LOW in this example) to turn off a corresponding switching device Q1, Q2 or a second state (HI) to turn on the corresponding device Q1, Q2. In operation, the controlled operating states of the switching devices Q1 and Q2 may be implemented by provision of voltage signals within a particular range in order to turn the switching device on or off.

Figure 2:
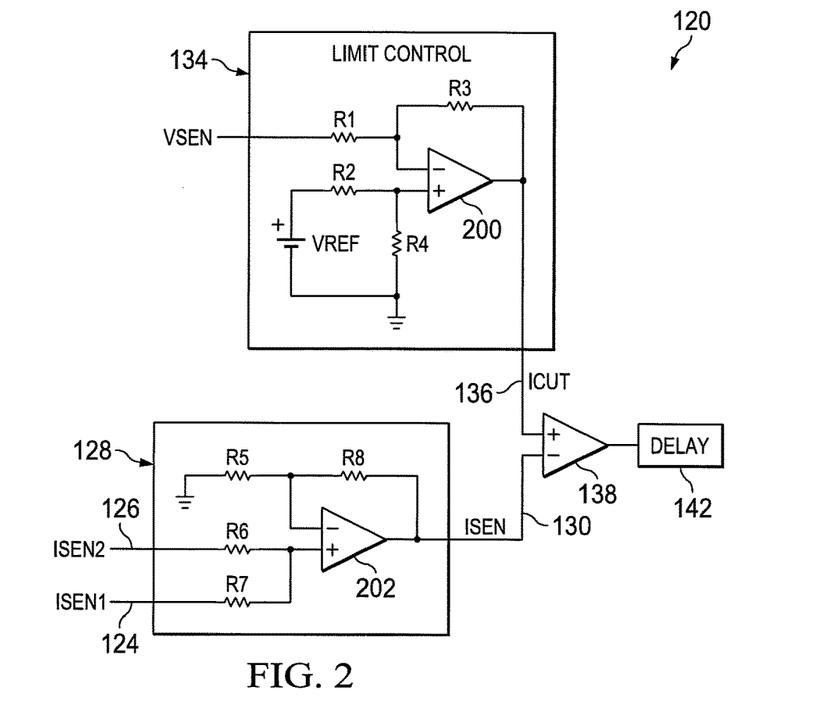
FIG. 2 is a schematic diagram illustrating details of an exemplary current limiting circuit in the system of FIG. 1.
Figure 3:
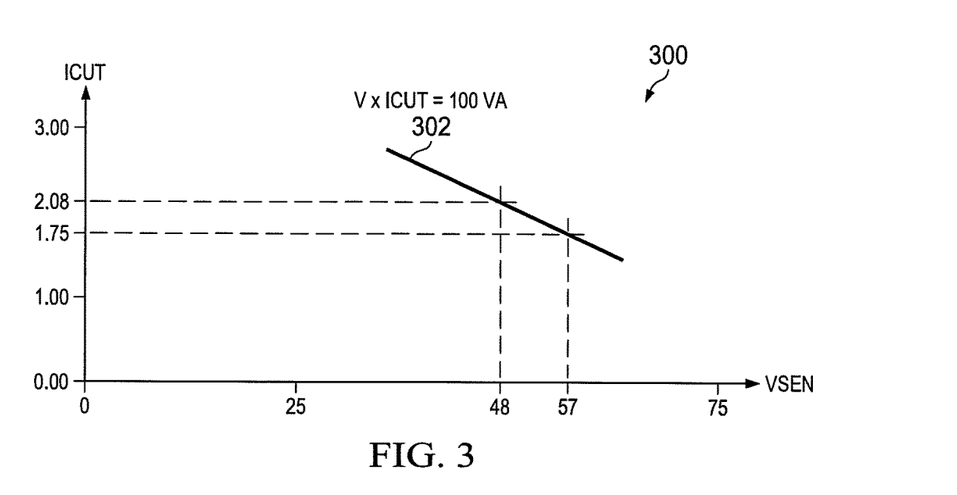
FIG. 3 is a graph illustrating an adaptive current limit as a function of measured supply voltage corresponding to a constant power limit implemented by the current limiting circuit.

Referring also to FIGS. 2 and 3, further details of an exemplary controller circuit 120 are illustrated, including a switch control circuit with a comparator 138 and an optional delay circuit 142, as well as a limit circuit 134 providing a power (V×I) limit control function based on a sensed supply voltage input signal VSEN. In operation, the output 140 of the comparator 138, whether coupled directly to drive the gate terminals G of the switching devices Q1, Q2 or whether coupled through an optional delay circuit 142, operates in a first state (LOW in this example) to turn off one or both of the switches Q1, Q2 in response to sensed current exceeding a limit provided by the limit circuit 134. Otherwise (HI signal at comparator output 140), the comparator output 140 allows the switches Q1, Q2 to remain in the conductive or ON state when the sensed supply current is below the limit. In the illustrated example, the supply currents I1 and I2 are separately sensed via input terminals 124 and 126 receiving current sense input signals ISEN1 and ISEN2, which are summed via a summation (e.g., summing amplifier) circuit 128 and provided as a first (e.g., inverting) input to the comparator 138 in the non-limiting embodiment, where the second comparator input 136 (non-inverting) is coupled to receive an output signal (ICUT) from the limit circuit 134.

The limit circuit 134 in the illustrated embodiment provides the limit signal ICUT corresponding to a constant power output of the power source 122 according to the supply voltage sense signal VSEN, in one example using a differential amplifier circuit including an op amp 200, resistors R1-R4 and a voltage reference VREF. In this implementation, a first limit circuit input at R1 receives the supply voltage sense signal VSEN from the IC terminal 132, and the reference voltage VREF is applied to a second input at R2. The output voltage signal ICUT in this example is given as VREF*((R1+R3)/R1)*(R4/(R4+R2))−VSEN*(R3/R1). Any suitable values can be used for R1-R4 to provide a generally inverse relationship between the sensed supply voltage signal VSEN and a current limit value represented by the output signal (ICUT) as shown in the curve 302 in graph 300 of FIG. 3, wherein the resistance values in the limit circuit 134 of FIG. 2 can be tailored according to a given desired maximum power limits for operation of the PoE system 100 and the power sourcing equipment 102 thereof. In addition, any suitable summing circuit 128 can be employed for embodiments utilizing multiple ports with 2 or more corresponding current sensor inputs 124 and 126 as shown in FIG. 2. In this example, a non-inverting summing amplifier circuit is provided via an op amp 202 using resistors R5, R6, R7 and R8 connected as shown, with the resulting output signal ISEN being provided to represent the sum of the individual current sense input signals ISEN1+ISEN2, wherein any suitable resistance values can be used for the resistors R5-R8, preferably using equal values for R6 and R7.

In this manner a generally constant power limit threshold can be implemented by the limit circuit 134 for comparison with the sensed current signal ISEN using the comparator 138. As a result, the controller IC 120 implements an "adaptive fuse" or adaptive current limit characteristic. In operation, the limit operation effectively allows a load (PD) 104 to be powered from the PSE 102 while consuming the maximum (or near the maximum) safe amount of power (e.g., watts) despite variability in the supply voltage level Vs since the signal ICUT provided by the limit circuit 134 corresponds to a constant power output of the power source 122. For example, the curve 302 in FIG. 3 corresponds to a 100 VA constant limit, showing two exemplary supply voltage levels 48 V and 57 V. At the 48 V operating point, the constant power limit corresponds to a supply current level of approximately 2.08 A, whereas operation at a supply voltage of 57 V corresponds to a safe supply current level of approximately 1.75 A. Thus, traditional fixed current limit comparison approaches would necessarily set the current limit to represent 1.75 A, but operation with a power source providing only 48 V would mean that the effective power limitation for the PSE system would provide only 84 W to the powered device 104. Consequently, the adaptive current limit approach providing the limit signal ICUT based at least partially on the sensed supply voltage signal VSEN advantageously allows a powered device 104 to potentially draw more current through the communication cable 106 than was possible using the conventional approach, while still maintaining safe operating conditions according to suitable agency ratings or other safety considerations. Moreover, the limit control circuit 134 provides a simple, low-cost solution to this problem, thereby making available the maximum safe amount of power from a power sourcing equipment 102 to a degree not possible using traditional approaches given the potential variability in the source voltage Vs.

Figure 4:
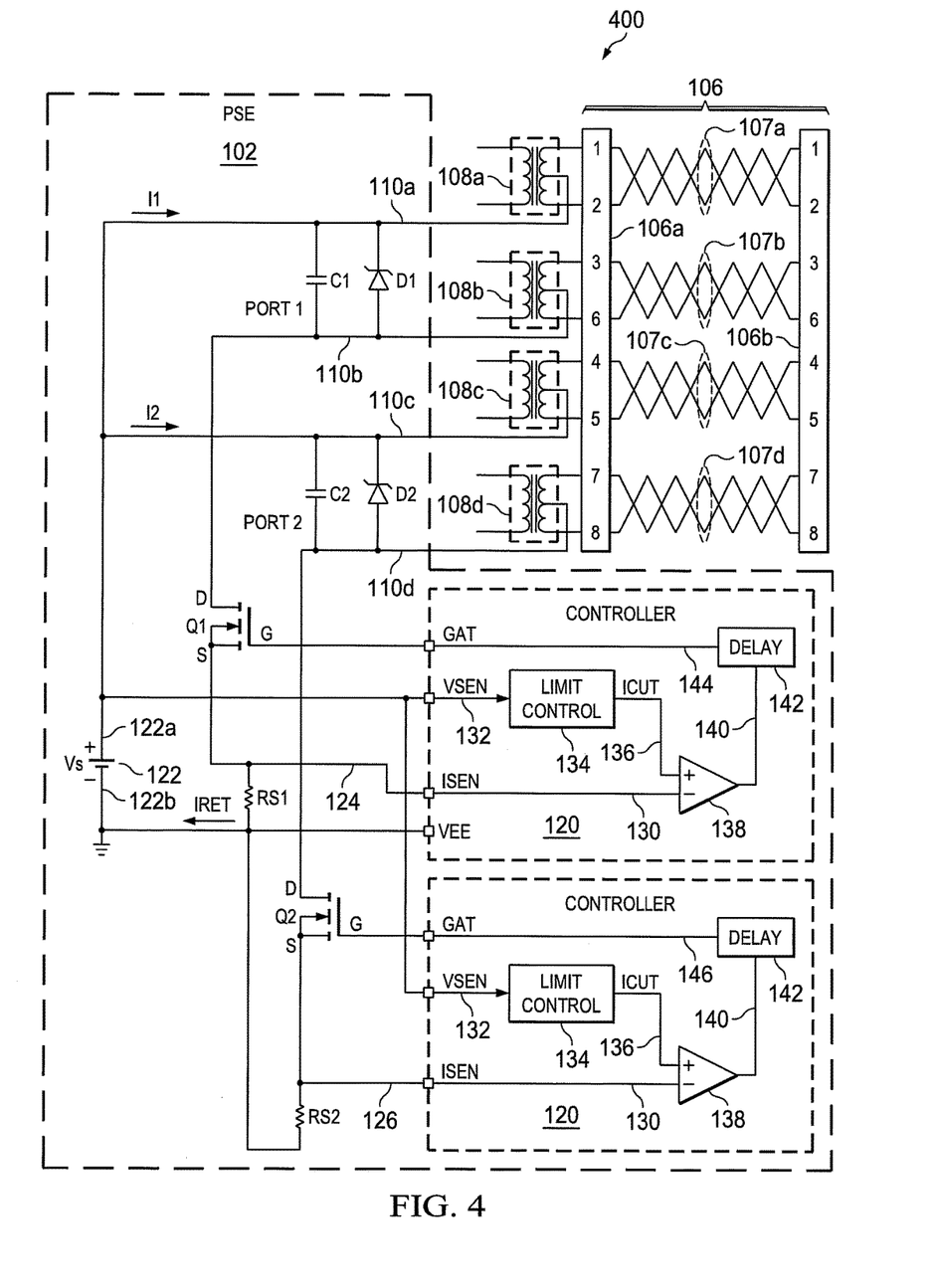
FIG. 4 is a schematic diagram illustrating another communication system with two adaptive current limiting controller integrated circuits controlling provision of power to a powered device through two ports of an Ethernet cable.

FIG. 4 shows an alternate communication system implementation 400 using two adaptive current limiting controller ICs 120 generally as described above, but individually including a single current sense input 130 provided to the inverting input 130 of the comparator 138, where operation of the comparator 138 and the limit circuit 134 individually control provision of power to the powered device 104 through corresponding ports of the Ethernet cable 106.

As seen in FIGS. 1, 2 and 4, moreover, certain embodiments may include a delay circuit 142 coupled between the switch control circuit output 140 and the gate control output(s) 144, 146, with the delay circuit 142 operative to selectively control the switching device gate voltage(s) to be in the second voltage range (e.g., LOW) if the signal ISEN exceeds the limit signal ICUT for a predetermined time. In this manner, the controller ICs 120 advantageously avoid nuisance tripping while accommodating intermittent peak power draw from the powered device 104, and while still maintaining safe operating conditions in the PoE system 100.

Figure 5:
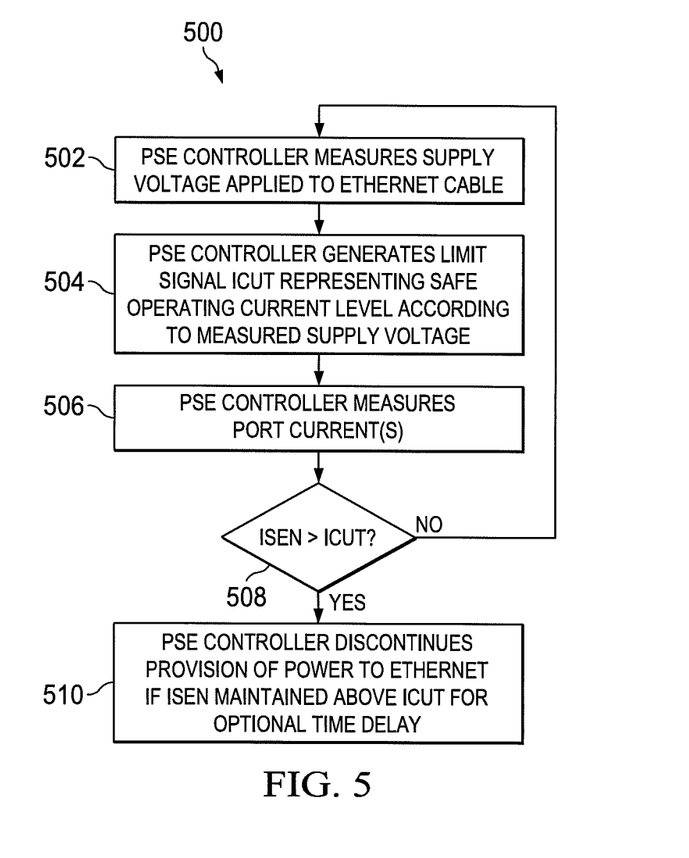
FIG. 5 is a flow diagram illustrating an exemplary method for controlling provision of power from a power source to a powered device through a communication cable.

FIG. 5 illustrates an exemplary method 500 for controlling provision of power from a power source to a powered device through a communication cable 106, which can be implemented using the described control circuitry 120 in certain embodiments. Although the method 500 is illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware as illustrated and described above, and/or using processor-executed software, processor-executed firmware, FPGAs, logic circuitry, etc. or combinations thereof, in order to provide the adaptive power supply limit control functionality described herein, although the present disclosure is not limited to the specifically illustrated or described applications and systems.

At 502, the supply voltage Vs provided by a power source 122 is measured (e.g., via the VSEN signal sensed by the controller 120 above), and a limit signal ICUT is generated at 504, in certain embodiments corresponding to a predetermined safe operating power output level of the power source 122 based at least partially on the measured supply voltage Vs. For example, the generated limit signal ICUT may be generated at 504 so as to represent a supply current level corresponding to the predetermined safe operating power output level of the power source 122 at the measured supply voltage Vs shown in the example of FIG. 3 above. At 506 in FIG. 5, a supply current flowing through the communication cable 106 is measured. As described above, moreover, the process 500 may further include measurement of two or more supply currents (e.g., I1 and I2 in the above examples), and summing the measured supply currents to determine a total supply current at 506 (e.g., I1+I2) flowing through the communication cable 106. The supply current is then compared at 508 with the limit signal (ICUT), and provision of power from the power source 122 to the communication cable 106 is selectively discontinued at 510 if the measured supply current I1 exceeds the limit signal ICUT. As discussed above, moreover, the discontinuation of provided power at 510 may include an optional delay (e.g., via a delay circuit 142) such that the power is discontinued if the measured current is maintained above ICUT for a predetermined non-zero time.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A communication system comprising: a communication cable with first and second ends and first and second wire pairs individually extending between the first and second ends; a power source including a first power source terminal coupled with the first wire pair at the first end of the communication cable, and a second power source terminal, the power source operative to provide a supply voltage between the first and second power source terminals and to provide a supply current from the first terminal to the first wire pair; a switching device including a first switch terminal coupled with the second wire pair, a second switch terminal coupled with the second power source terminal, and a control terminal, the switching device operative in a first mode when the control terminal is in a first voltage range to allow the supply current to flow from the second wire pair to the second power source terminal and in a second mode when the control terminal is in a second voltage range to inhibit current flow from the second wire pair to the second power source terminal; a switch control circuit including a first input receiving a first sense signal representing the supply current flowing from the second wire pair to the second power source terminal, a second input receiving a limit signal, and an output operative to selectively control the voltage at the control terminal of the switching device to be in the second voltage range responsive to the first sense signal exceeding the limit signal; and a limit circuit having an input receiving a second sense signal representing the supply voltage provided by the power source, and an output coupled to provide the limit signal to the second input of the switch control circuit, the limit signal corresponding to a constant power output of the power source and based on the second sense signal.

2. The communication system of claim 1, wherein the limit circuit is operative to provide the limit signal inversely related to the second sense signal.

3. The communication system of claim 2, wherein the limit circuit is operative to provide the limit signal corresponding to a constant power output of the power source.

4. The communication system of claim 2, wherein the limit circuit includes an amplifier circuit with a first input receiving the second sense signal and a second input coupled with an offset signal, and an amplifier output providing the limit signal.

5. The communication system of claim 4: wherein the communication cable comprises third and fourth wire pairs individually extending between the first and second ends; wherein the first power source terminal is coupled with the third wire pair at the first end of the communication cable; wherein the power source is operative to provide a second supply current from the first terminal to the third wire pair; wherein the communication system further comprises a second switching device including a first switch terminal coupled with the fourth wire pair, a second switch terminal coupled with the second power source terminal, and a second control terminal, the second switching device operative in a first mode when the second control terminal is in the first voltage range to allow the second supply current to flow from the fourth wire pair to the second power source terminal and in a second mode when the second control terminal is in the second voltage range to inhibit current flow from the fourth wire pair to the second power source terminal; wherein the communication system further comprises a summing circuit including a first input receiving a first current sense signal representing the supply current flowing from the second wire pair to the second power source terminal, a second input receiving a second current sensor signal representing the second supply current flowing from the fourth wire pair to the second power source terminal, and a summing circuit output providing the first sense signal to the first input of the switch control circuit representing a sum of the supply currents flowing to the second power source terminal; and wherein the output of the switch control circuit is operative to selectively control the voltages at the control terminals of the switching device and the second switching device to be in the second voltage range responsive to the first sense signal exceeding the limit signal and otherwise in the first voltage range.

6. The communication system of claim 5, comprising: a first sense resistance connected between the second switch terminal of the switching device and the second power source terminal; and a second sense resistance connected between the second switch terminal of the second switching device and the second power source terminal; wherein the first input of the summing circuit is connected to the first sense resistance and the second switch terminal of the switching device to receive the first current sense signal as a voltage signal representing the supply current flowing from the second wire pair to the second power source terminal; and wherein the second input of the summing circuit is connected to the second sense resistance and the second switch terminal of the second switching device to receive the second current sensor signal as a voltage signal representing the second supply current flowing from the fourth wire pair to the second power source terminal.

7. The communication system of claim 5, comprising a delay circuit coupled with the output from the switch control circuit and operative to selectively control the voltages at the control terminals of the switching device and the second switching device to be in the second voltage range when the first sense signal exceeds the limit signal for a predetermined time.

8. The communication system of claim 1, comprising: a sense resistance connected between the second switch terminal of the switching device and the second power source terminal; wherein the first input of the switch control circuit is connected to the first sense resistance and the second switch terminal of the switching device to receive the first sense signal as a voltage signal representing the supply current flowing from the second wire pair to the second power source terminal.

9. The communication system of claim 8, comprising a delay circuit coupled with the output from the switch control circuit and operative to selectively control the voltage at the control terminal of the switching device to be in the second voltage range when the first sense signal exceeds the limit signal for a predetermined time.

10. The communication system of claim 1, comprising a delay circuit coupled with the output from the switch control circuit and operative to selectively control the voltage at the control terminal of the switching device to be in the second voltage range when the first sense signal exceeds the limit signal for a predetermined time.

11. The communication system of claim 1, wherein the limit circuit is operative to provide the limit signal corresponding to a constant power output of the power source.

12. A method for powering a device through a communication cable in a power over Ethernet system, the method comprising: measuring a supply voltage provided by a power source to the communication cable; generating a limit signal corresponding to a constant operating power output level of the power source and based on the measured supply voltage; measuring a supply current flowing through the communication cable; comparing the measured supply current with the limit signal; and selectively discontinuing provision of power from the power source to the communication cable when the measured supply current exceeds the limit signal;

wherein selectively discontinuing provision of power comprises discontinuing provision of power from the power source to the communication cable when the measured supply current exceeds the limit signal for a predetermined non-zero time.

13. The method of claim 12, comprising: measuring a second supply current flowing through the communication cable; summing the measured supply currents to determine a total supply current flowing through the communication cable; comparing the total supply current with the limit signal; and selectively discontinuing provision of power from the power source to the communication cable when the total supply current exceeds the limit signal.

14. The method of claim 12, wherein the generated limit signal represents a supply current level corresponding to the constant operating power output level of the power source at the measured supply voltage.

* * * * *